Sept. 21, 1965　　　　A. J. PAGAN　　　　3,207,881
ARC WELDING APPARATUS AND METHOD
Filed March 19, 1963　　　　　　　　　　14 Sheets-Sheet 1

INVENTOR
AUGUSTINE J. PAGAN
Strauch, Nolan + Neale
ATTORNEYS

INVENTOR
*Augustine J. Pagan*

Sept. 21, 1965         A. J. PAGAN         3,207,881

ARC WELDING APPARATUS AND METHOD

Filed March 19, 1963         14 Sheets-Sheet 6

INVENTOR
*Augustine J. Pagan*

BY

ATTORNEYS

INVENTOR
Augustine J. Pagan

Sept. 21, 1965        A. J. PAGAN        3,207,881
ARC WELDING APPARATUS AND METHOD
Filed March 19, 1963        14 Sheets-Sheet 8
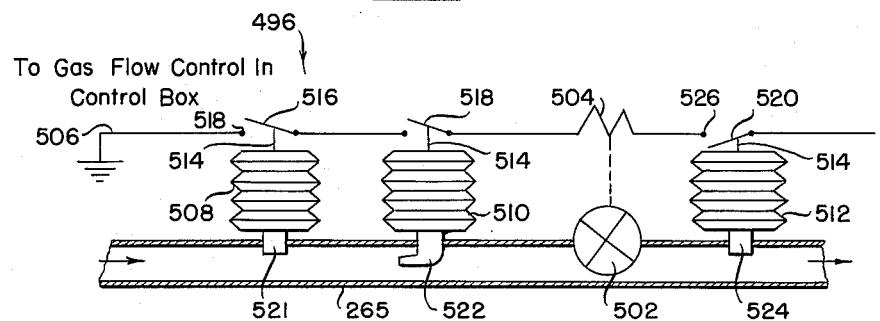
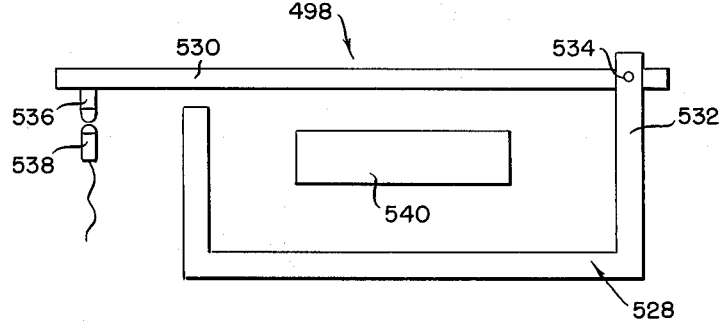
INVENTOR
*Augustine J. Pagan*
BY
ATTORNEYS Sept. 21, 1965      A. J. PAGAN      3,207,881

ARC WELDING APPARATUS AND METHOD

Filed March 19, 1963      14 Sheets-Sheet 9

INVENTOR
*Augustine J. Pagan*

BY *Strauch, Nolan & Neale*

ATTORNEYS

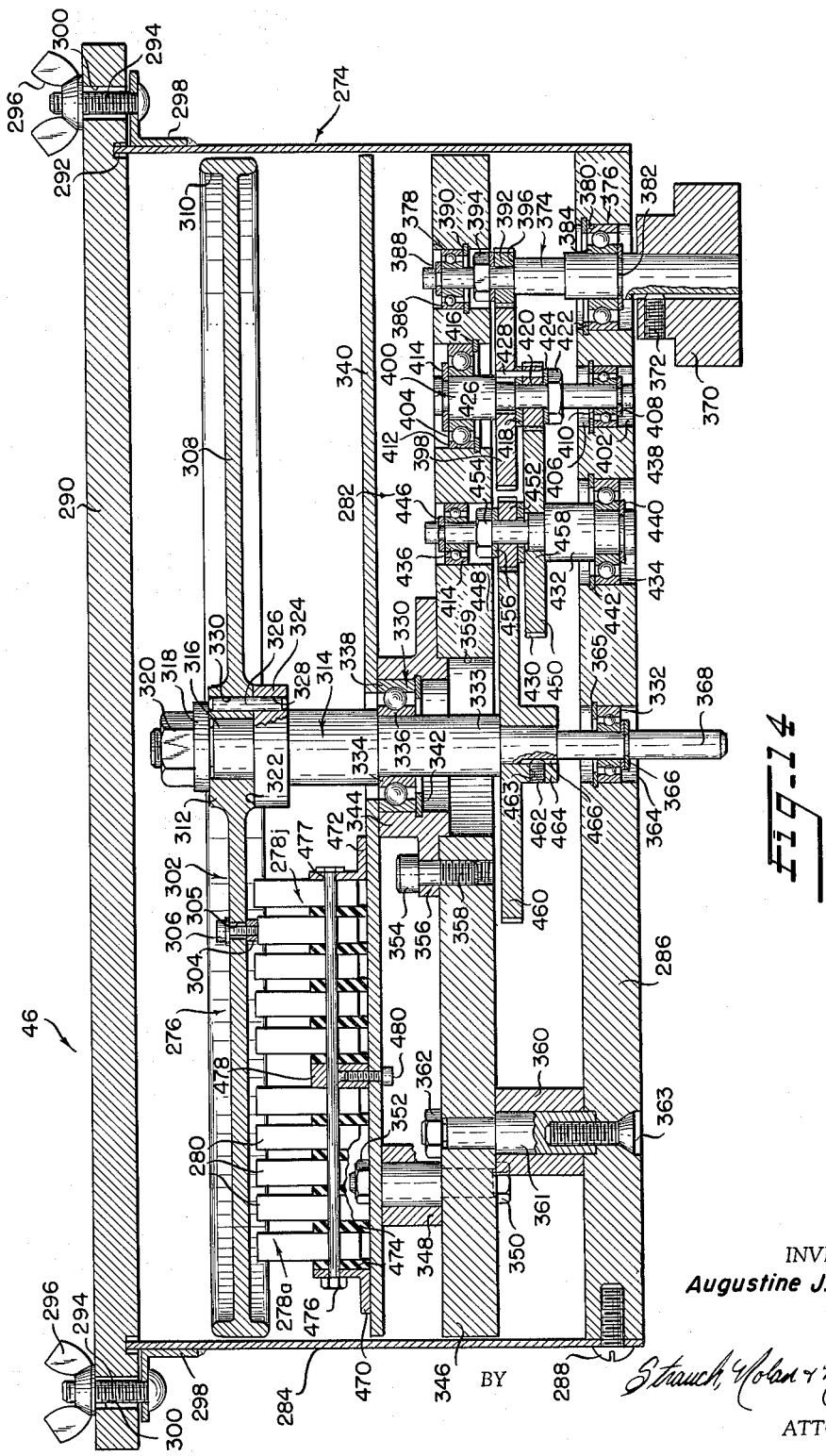

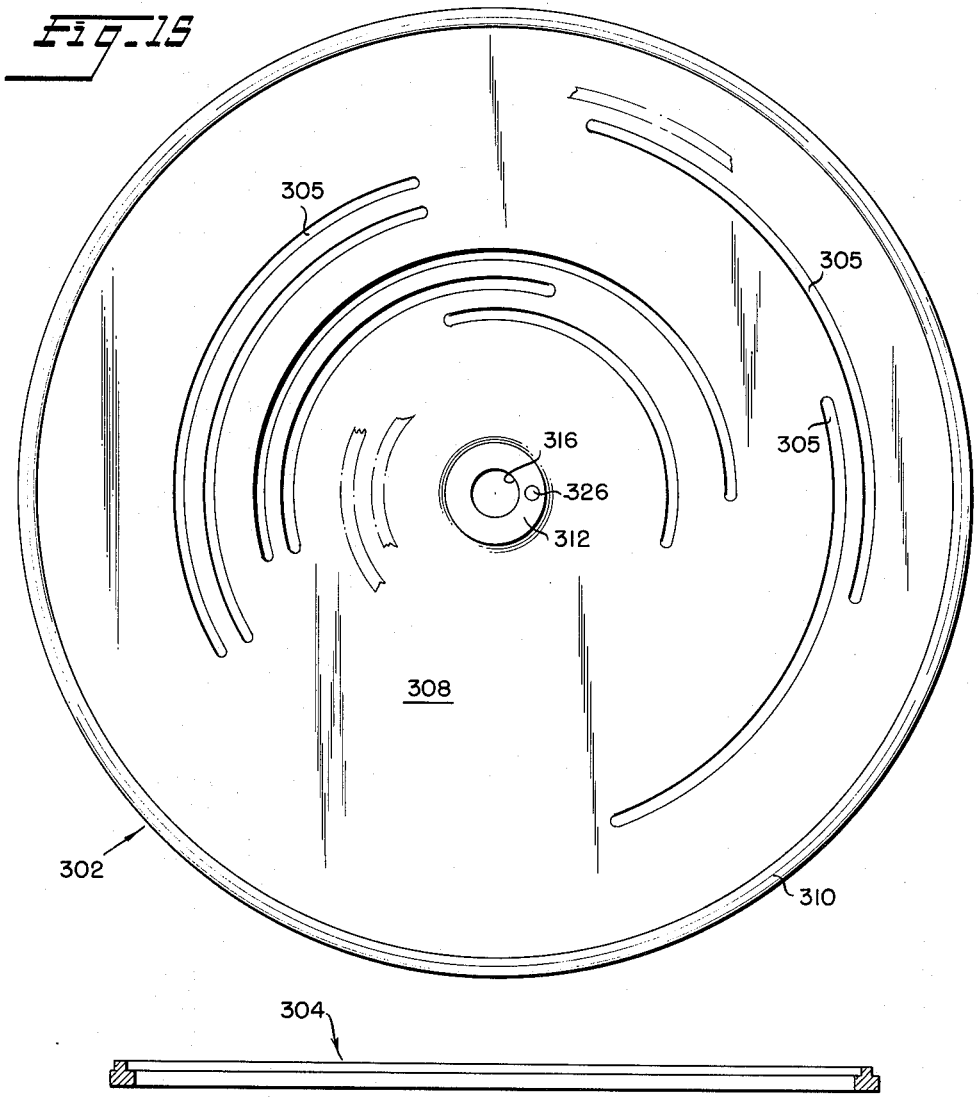

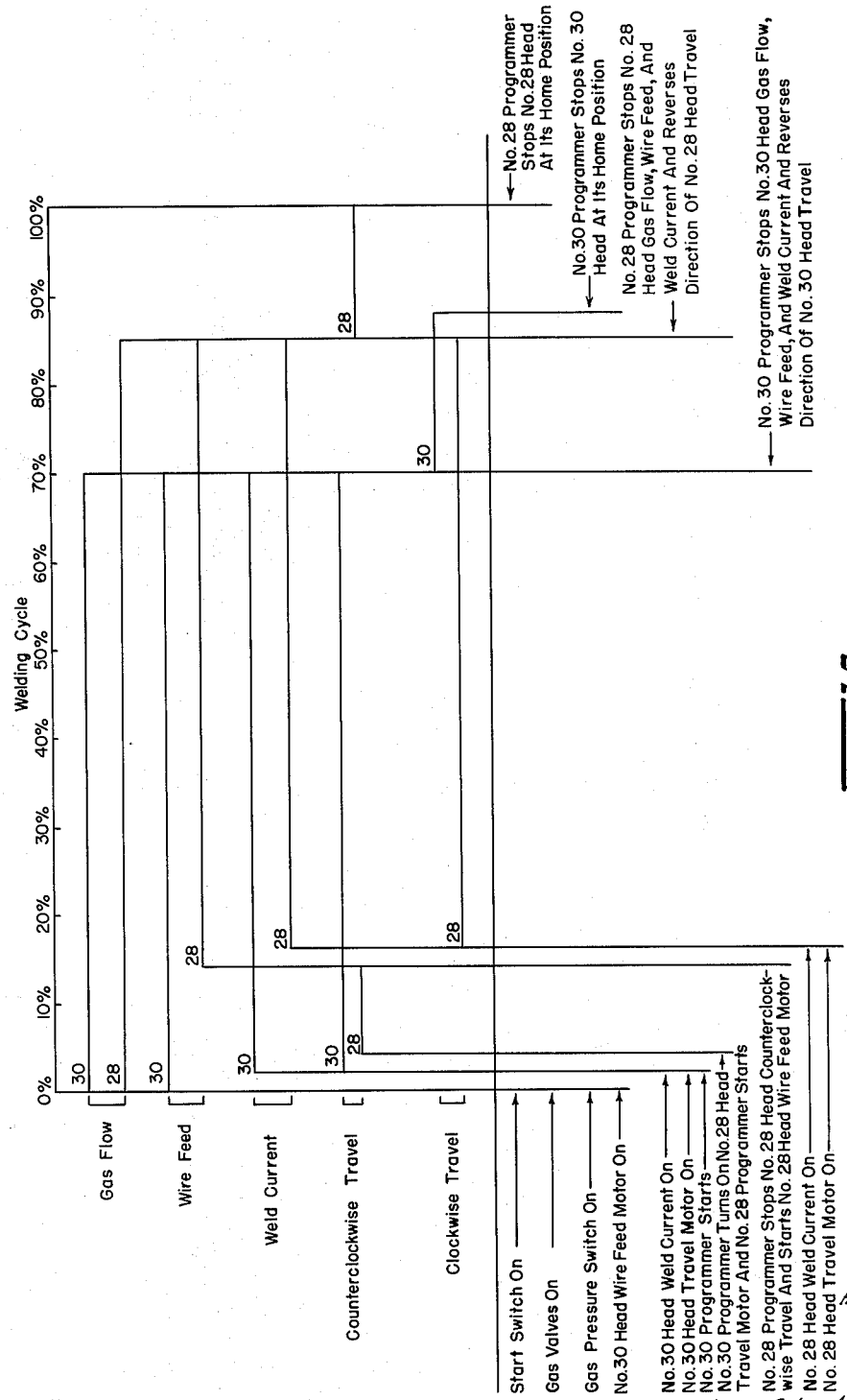

Sept. 21, 1965 A. J. PAGAN 3,207,881
ARC WELDING APPARATUS AND METHOD
Filed March 19, 1963 14 Sheets-Sheet 14
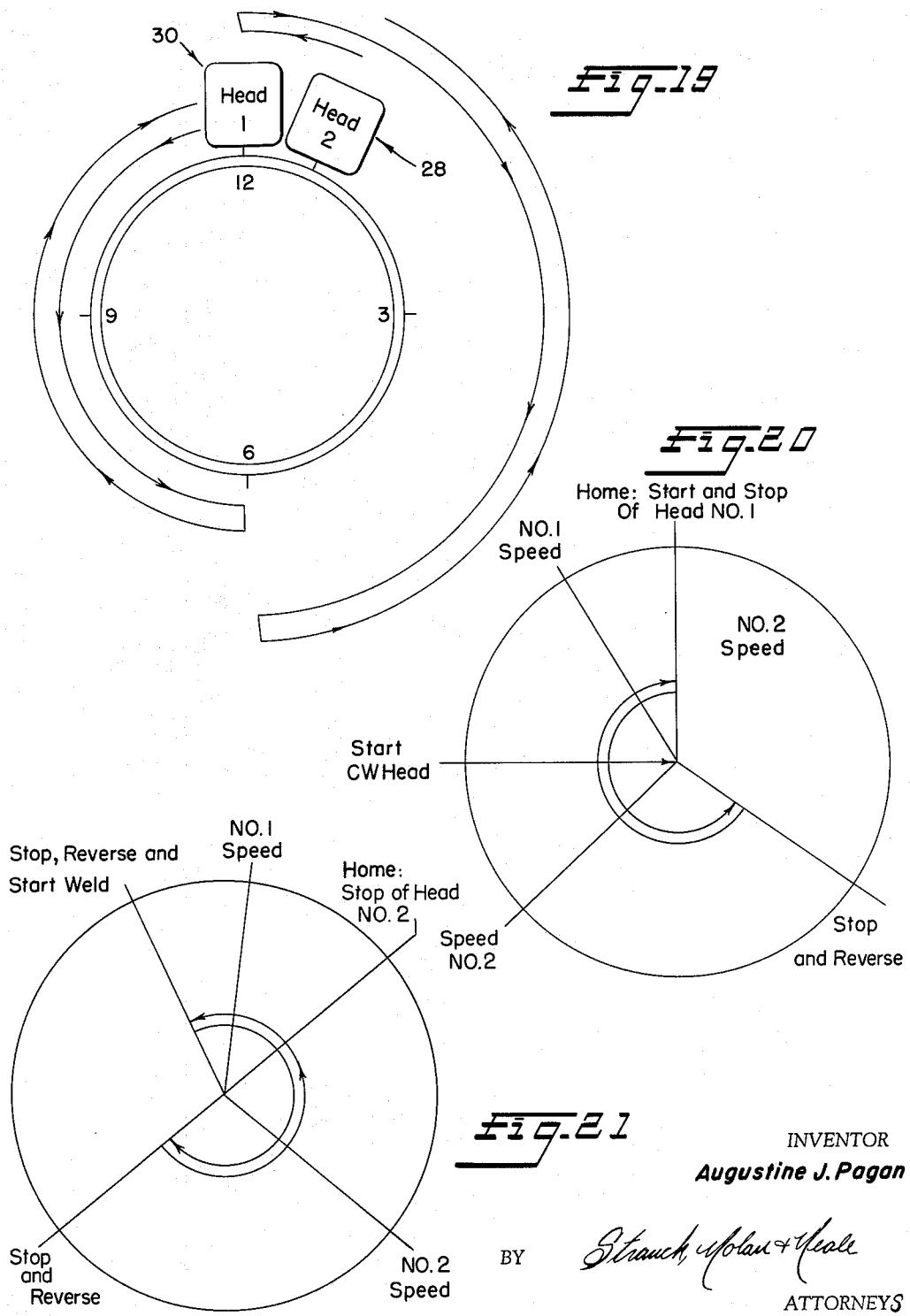
INVENTOR
*Augustine J. Pagan*
BY
ATTORNEYS

United States Patent Office 3,207,881
Patented Sept. 21, 1965

1

3,207,881
ARC WELDING APPARATUS AND METHOD
Augustine J. Pagan, El Cajon, Calif., assignor, by mesne assignments, to American Machine & Foundry Company, New York, N.Y., a corporation of New Jersey
Filed Mar. 19, 1963, Ser. No. 266,292
17 Claims. (Cl. 219—60)

This invention relates to arc welding and, more specifically, to the automatic arc welding of large diameter pipe and the like. The arc welding apparatus provided by the present invention is particularly suited for use in the construction of pipelines although it is by no means limited to this application.

Numerous pipelines, hundred of miles in length and typically on the order of 30–36 inches in diameter, have been constructed to carry crude oil, refined petroleum products, natural gas, and similar products from the point of origin to processing and distribution centers. The petroleum and, more recently, the coal industry have shown a continuing interest in such lines and a number of additional lines are in the construction or planning stage.

In constructing a pipeline of this type, high speed trenching machines are utilized to dig a ditch or trench for the pipe. At the same time, sections of pipe, generally on the order of 40 feet long, are positioned alongside the open trench. A backup expander, preferably of the type shown in copending application Serial No. 282,066 filed May 21, 1963, is stationed in the line and locked into position in the open end of the pipe section last welded into the line such that the backup element will straddle the new joint when a new pipe section is positioned. Movable rigging along the trench is utilized to hoist a new pipe section and align it in abutting relation with the last section on the backup element which now is expanded to size the pipe ends, hold them in alignment while they are welded, and provide a heat sink during the welding operation. After the backup expander is in place, the abutted pipe ends are welded together. Welding of the pipe ends is followed by operations in which the pipe is coated with protective material and moved from the temporary rigging into the trench after which the trench is filled.

The progress of the above pipeline constructing operation, which may be spread over a distance of as much as ten miles, has in the past been dictated by the speed with which the pipe sections could be welded. Manual welding has heretofore been almost exclusively employed because of the lack of suitable automatic welding apparatus. In welding pipe of 30–36 inch diameter, a journeyman welder can produce an acceptable root pass in 16–22 minutes and a complete weld of perhaps eight passes in about 45 minutes. At this speed, pipe sections cannot be joined to the pipeline with sufficient rapidity to keep pace with the other operations in the construction process.

Several types of automatic machines have in the past been developed for welding the pipe sections in an effort to alleviate the retardment on the construction process caused by manual welding. Typical of the prior art machines are those described in United States Patent No. 2,013,630 issued September 3, 1935, to W. E. Goldsborough for "Automatic Welder" and in pages 813–820 of the August 1961 Welding Journal and pages 111–114 of the February 1962 Welding Journal.

One main drawback of the prior art machines is that preparation of the pipe ends with an abrasive cutoff wheel is required after the pipe section to be joined has been aligned with the end of the completed portion of the line. Another disadvantage is that the welds produced are not always of satisfactory quality. Still another drawback is that, although they can lay in a weld more quickly than can be done by manual welding, the prior art machines cannote produce a welded joint fast enough that full advantage can be taken of the capabilities of the other high speed machines available for pipeline construction.

Accordingly, one object of the present invention resides in the provision of improved automatic arc welding apparatus for joining sections of large diameter pipe and the like.

In conjunction with the foregoing object, further objects of the present invention include:

(1) The provision of automatic arc welding apparatus capable of producing high quality girth welds at speeds substantially in excess of those attainable by the use of prior art arc welding machines.

(2) The provision of automatic arc welding apparatus capable of producing high quality welds at high speeds without the necessity of joint preparation after the pipe sections or the like have been aligned and clamped in preparation for the welding operation.

The novel arc welding apparatus of the present invention, by which the foregoing objects are achieved, includes a supporting framework which can quickly be fixed to the pipe sections and which can be readily and easily advanced along the pipeline to weld on succeeding sections. Mounted on the framework are two welding torches and a drive system for moving the torches in opposite directions downwardly around the pipe sections to simultaneously lay in welds on opposite sides of the joint. A novel control system is mounted on the framework to independently program and synchronize the movement of the two torches and to interrupt the welding operation if an abnormal or unsafe condition arises. Although two torches or weld heads are discussed, it is obvious that the use of more than two heads is contemplated, each head arranged with its supporting ring gear and connected into the system such that it will weld a given portion of the periphery in cooperation with the other heads.

The novel welding apparatus described above has a number of important advantages over the prior art machines. It can produce high quality welds faster than the prior art machines. It eliminates the need for time consuming, expense increasing joint preparation. The welding operation is automatically terminated if an abnormal or unsafe condition arises. The apparatus is extremely versatile since the heads may be programmed to produce overlapping or other welds.

As is apparent from the above description of the present invention, further objects of this invention include:

(3) The provision of novel automatic arc welding apparatus having a fail-safe system for terminating the welding operation if abnormal or unsafe conditions arise.

(4) The provision of novel automatic arc welding apparatus for joining large diameter pipes and the like having two welding torches and a system including independently programmed drive systems for moving the torches in opposite directions around the pipes or other articles to be joined to simultaneously lay welds in both sides of the joint between the sections.

(5) In conjunction with the preceding objects, the provision of automatic arc welding apparatus for joining large diameter pipe and the like which is rugged, relatively inexpensive to manufacture and maintain, and which utilizes a maximum number of commercially available components.

Additional objects and further novel features of the present invention will become fully apparent from the appended claims and as the ensuing detailed description and discussion proceeds in conjunction with the accompanying drawing, in which:

FIGURE 8 is a generally diagrammatic view of a gas pressure sensor employed to shut down the apparatus if the inert shielding gas flowing to the welding torches deviates from a preselected flow rate;

FIGURE 9 is a generally diagrammatic illustration of a weld current sensor employed to shut down the apparatus if one of the torches loses its arc;

FIGURE 14 is a section through one of the programming units employed to control the operation and travel of the welding heads;

FIGURE 15 is a plan view of a detent disc employed in the programming unit;

FIGURE 16 is an elevation of a detent employed in the programming unit;

FIGURE 18 is a flow chart of an exemplary welding program;

FIGURE 19 illustrates the paths followed by the welding heads in one exemplary welding cycle; and FIGURES 20 and 21 illustrate the movement of the welding heads in another welding cycle.

Figure 1:
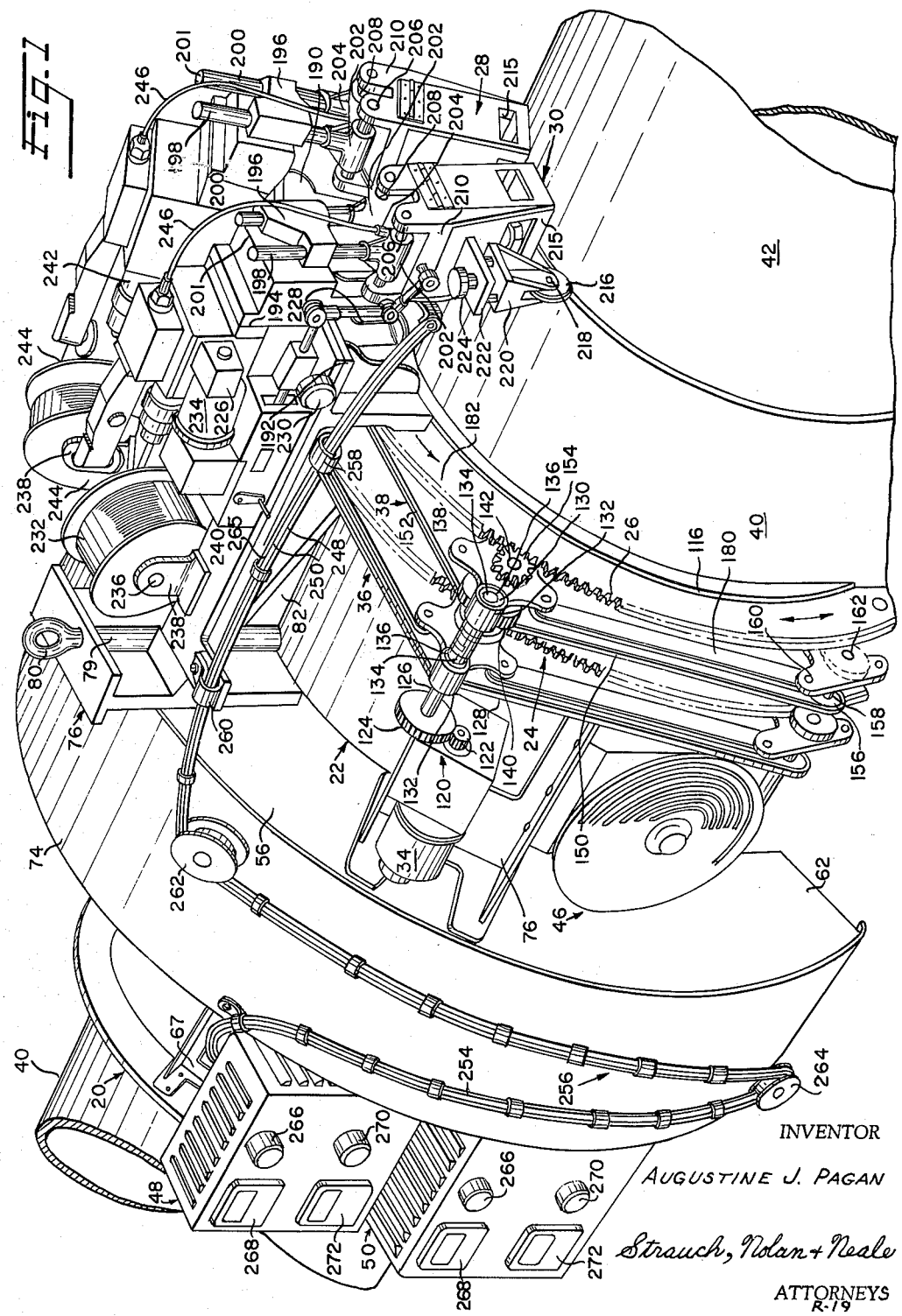
FIGURE 1 is a perspective view of the novel automatic arc welding apparatus provided by the present invention.
Figure 2:
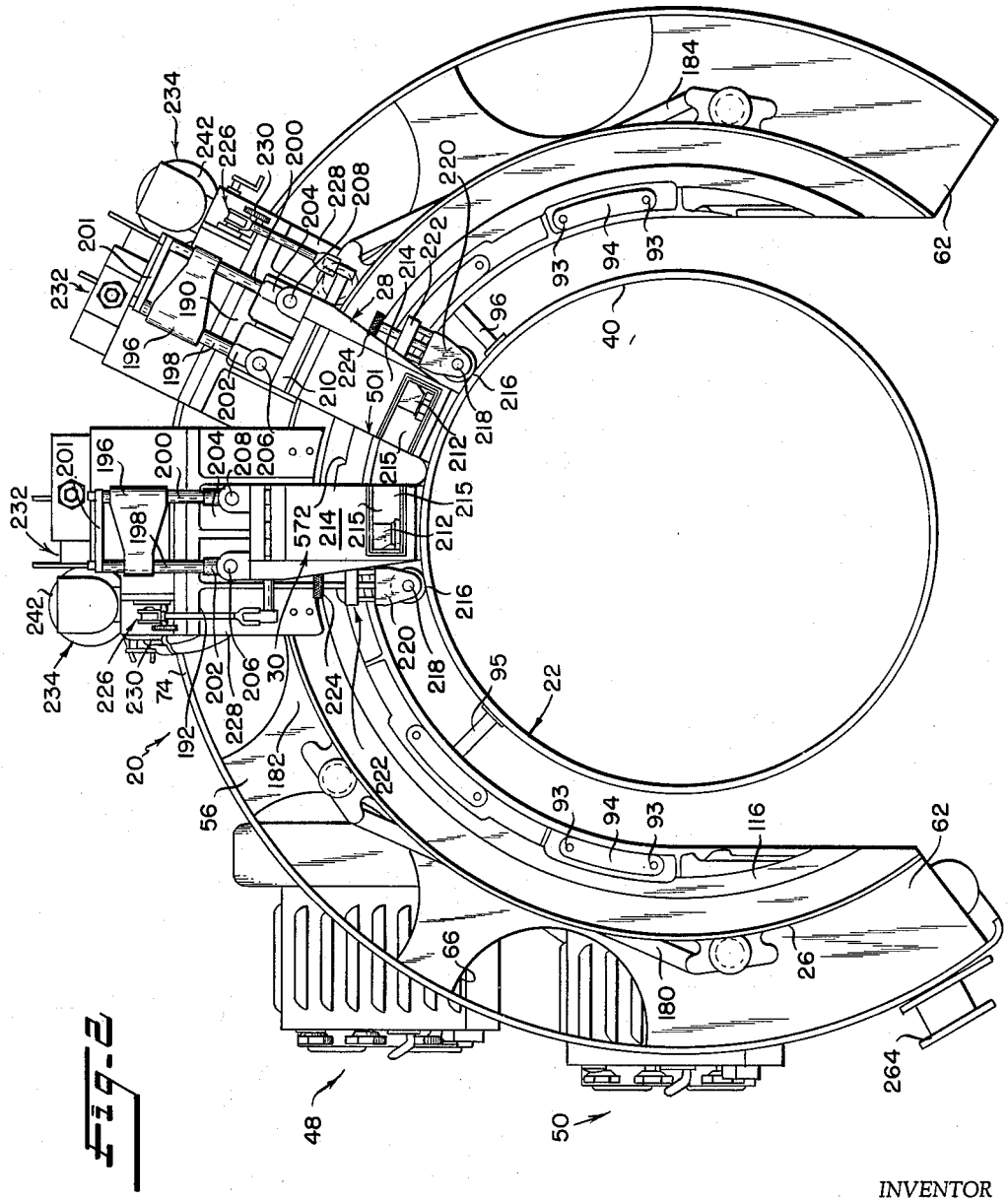
FIGURE 2 is an end elevation of the apparatus.
Figure 3:
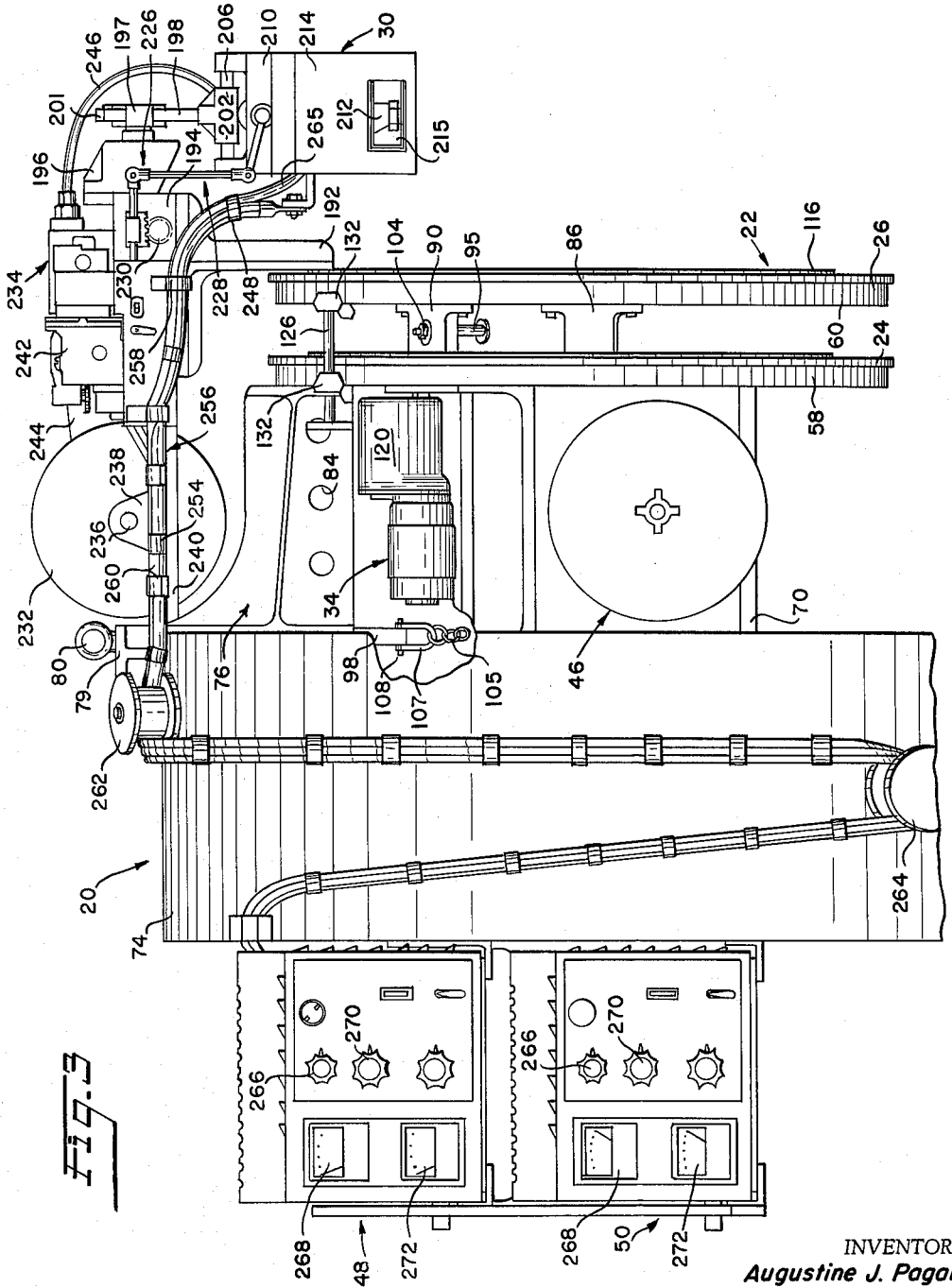
FIGURE 3 is a side elevation of the apparatus.

Referring now to FIGURES 1–3 of the drawing, the novel arc welding machine 20 of the present invention includes a framework 22 which is adapted to be rested on one of two pipe sections 40 and 42 which it is desired to join. Mounted on framework 22 are a pair of axially displaced, rotatable ring gears 24 and 26 to which conventional, inert gas shielded, consumable electrode welding heads 28 and 30 are fixed. Ring gears 24 and 26 are rotated by motors 32 and 34 fixed to framework 22 and connected to the ring gears by drive trains 36 and 38. The movements of the welding heads are independently controlled by programmers 46 (only one of which is shown) and control boxes or panels 48 and 50. Power may be supplied to arc welding machine 20 by an engine driven generator 51 (shown diagrammatically in FIGURE 17) such as the Lincoln SAE–600 weld generator.

Framework

Figure 4:
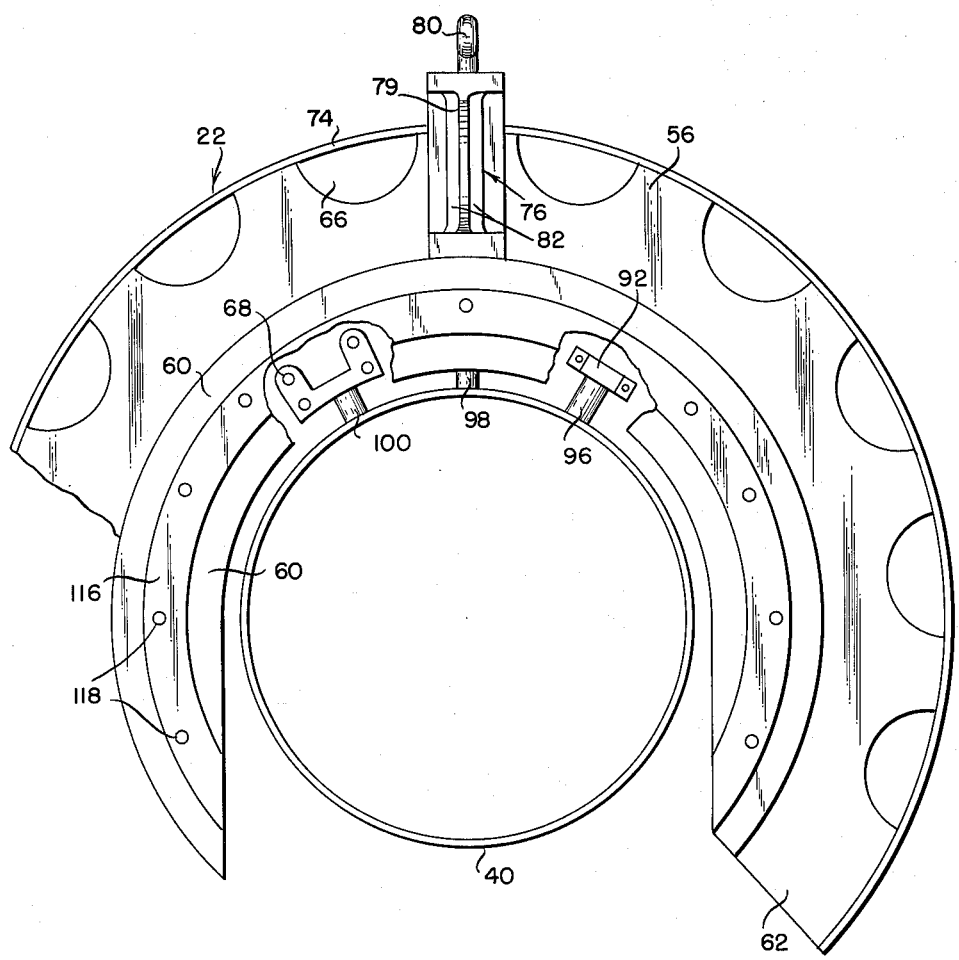
FIGURE 4 is an end elevation of the framework of the apparatus.
Figure 5:
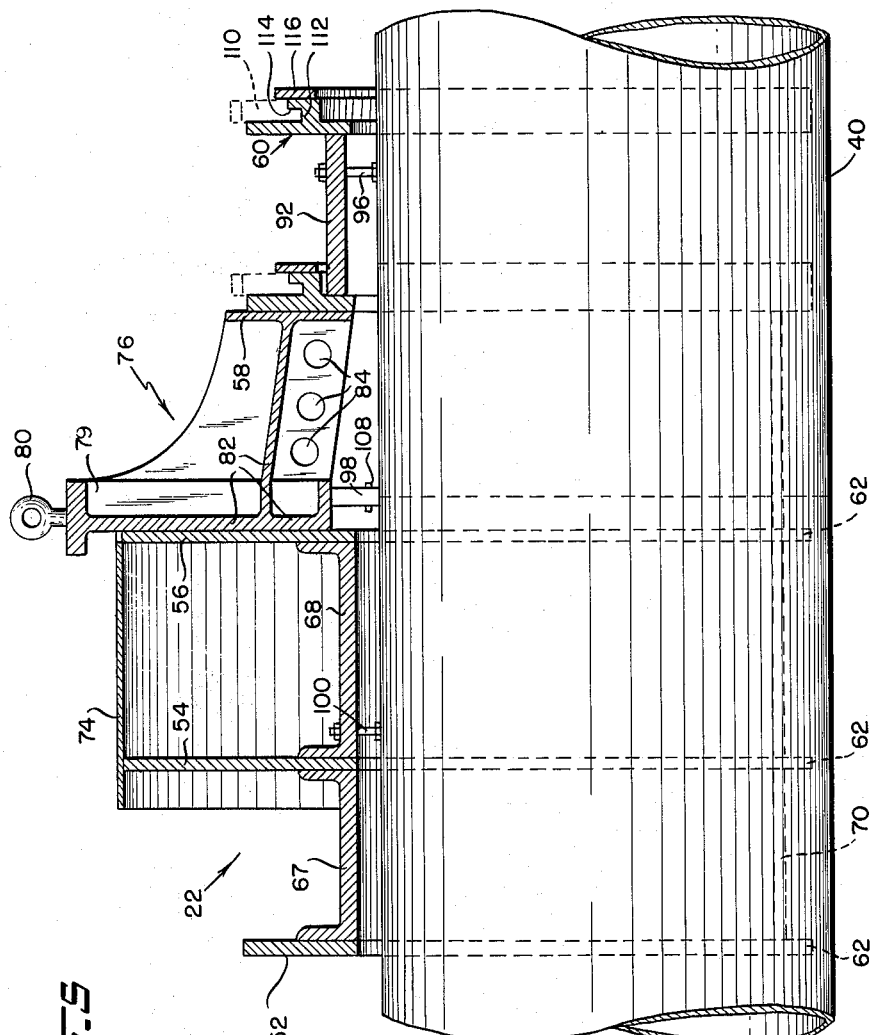
FIGURE 5 is a side elevation of the framework.

Referring now to FIGURES 4 and 5, welding machine framework 22 includes ribs 52, 54, and 56 and ring gear frames 58 and 60 which, when the welding machine is rested on a pipe section, are spaced along and extend transversely of the longitudinal axis of the pipe section. Ribs 52, 54, and 56, which may be fabricated from metal plate of appropriate thickness, have a horseshoe-like configuration providing depending legs 62 which are spaced sufficiently far apart to permit the welding machine to be lowered onto the pipe section. Scallops 66 are cut in the circular outer edges of ribs 54 and 56 (which have substantially larger diameters than ribs 52) to lighten their weight.

Ribs 52, 54, and 56 are joined, near the top of the framework, by longitudinally extending, preferably cast stiffeners 67 and 68 which extend between and are bolted at their opposite ends to adjacent transverse ribs. The lower ends of adjacent ribs are joined into a unitary assembly by tubular spacers 70 and 72 with a through bolt (see FIGURES 6 and 7) which extend from rib 52 through ribs 54 and 56 to ring gear support 58. Ribs 52, 54, and 56 and ring gear support 58 may be connected to spacers 70 and 72 as by welding. The assembly of ribs is further stiffened and partially encased by a sheet metal shroud 74 which extends between and axially beyond ribs 54 and 56 and is fixed to the outer edges 64 of these ribs. As is best shown in FIGURE 4, shroud 74 extends substantially around the peripheries of ribs 54 and 56.

Rear ring gear frame or support 58 is connected to transverse rib 56 by the longitudinally extending spacers 70 and 72 discussed above, by a cast stiffener 76 which extends between and is bolted to rib 56 and gear frame 58 at the top of the framework, and by stiffeners 77 and 78 which may be substantially identical to the stiffeners 68 and 70 described above. Stiffener 76 has a vertically extending leg 79 which, when welding machine 20 is completely assembled, is located at the machine's approximate center of gravity. A lifting eye 80, threaded into or otherwise fastened to stiffener leg 79, permits welding machine 20 to be lifted, as by a truck-mounted crane, and moved along the pipeline.

Stiffener 76 may be provided with integral ribs identified generally by reference character 82 to increase its strength and rigidity. Apertures 84 may be formed in stiffener 76 to decrease its weight.

Forward ring gear frame 60 is joined to rear ring gear frame 58 by cast stiffeners 86, 88, 90, and 92 which extend between and are bolted to the ring gear frames. The bolts 93 by which stiffeners 86, 88, 90, and 92 are fastened in place extend through ring gear frame 60 and metallic bars 94 located on the front side of forward ring gear frame 60 to prevent the bolts from unduly stressing the cast ring gear frame. Similar load distributing members (not shown) may be arranged on the back side of rear ring gear frame 58. Stiffeners 86 and 88 are located adjacent the lower ends and on opposite sides of the horseshoe-shaped ring gear frames; stiffeners 90 and 92 are located on opposite sides of and connected to the upper portions of the ring gear frames (see FIGURES 3 and 6).

Figure 6:
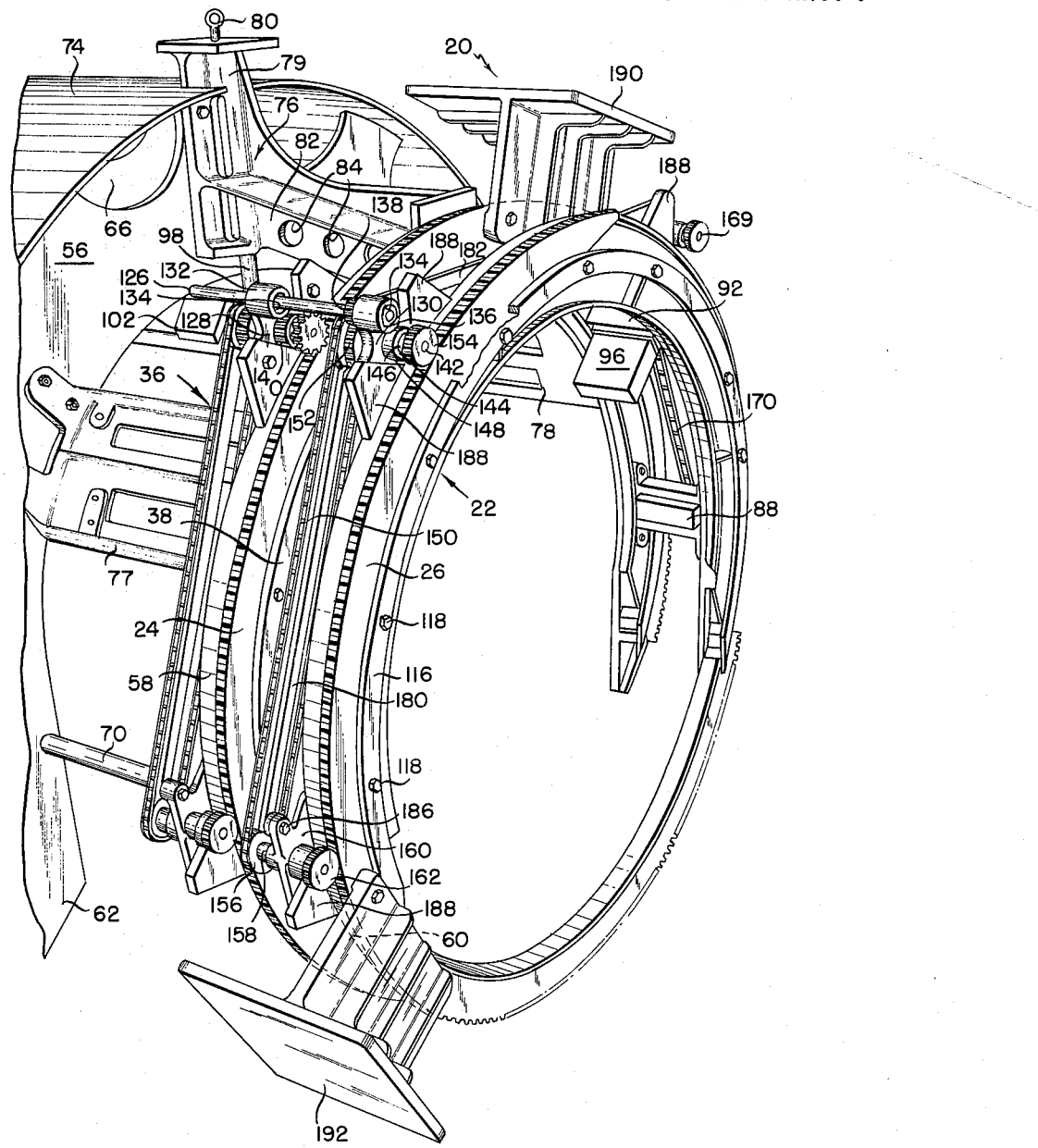
FIGURE 6 is a perspective view of the left side of the arc welding apparatus (looking from front to rear) with certain components removed to show the system provided for driving the ring gears on which the welding torches are mounted.

Framework 22 is supported in spaced relation to pipe section 40 by legs 95, 96, 98, 100, and 102 (see FIGURE 6). As is best shown in FIGURE 3, leg 95 extends through and is fastened to the stiffener 90 connecting ring gear frames 58 and 60 by a nut 104. Leg 96 is similarly fixed to the stiffener 92 between the ring gear frames. Leg 98 extends downwardly from and is fastened to the stiffener 76 connecting rib 56 and rear ring gear frame 58. Legs 100 and 102 are fixed to the stiffeners 68 and 70 connecting framework ribs 54 and 56 in the same manner that legs 95 and 96 are connected to stiffeners 90 and 92.

Figure 7:
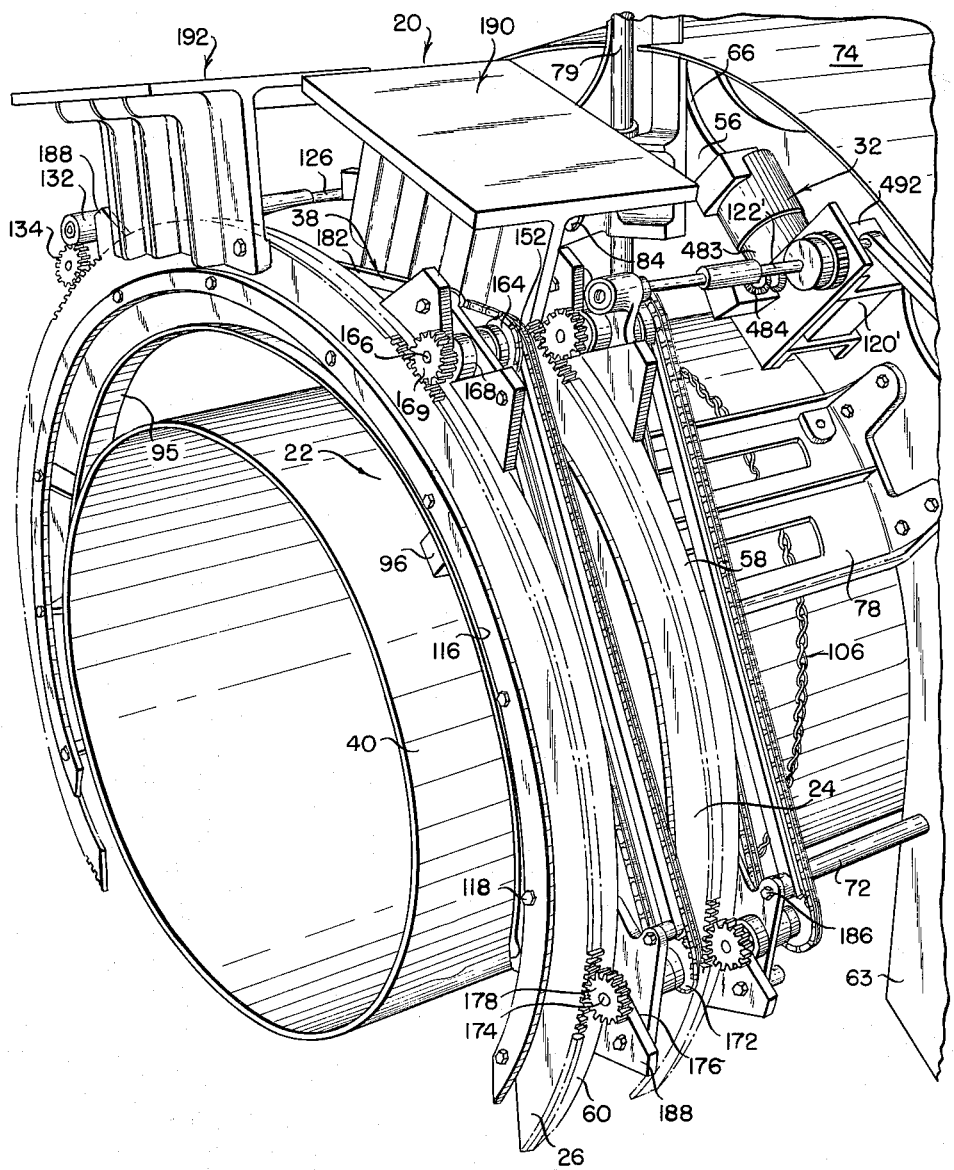
FIGURE 7 is a perspective view of the right side of the apparatus illustrating further details of the ring gear drive system.

Turning now to FIGURES 3 and 7, welding machine 20 is secured to the pipeline (pipe section 40 in FIGURES 3 and 7) during the welding operation by chains 105 and 106 connected at their upper ends to framework supporting leg 98 by clevises 107 and clevis pins 108. Any desired type of clamping device (not shown) may be employed to join the lower ends of chains 104 and 105 (which extend downwardly around opposite sides of pipe section 40) to secure welding machine 20 to pipe section 40. By attaching the upper ends of chains 105 and 106 to leg 98 rather than directly to framework 22, warping of and the imposition of undesirable stresses on the framework are avoided. In addition, this method of attaching chains 105 and 106 to welding machine 20 brings the upper end of the chains substantially closer to the pipe than they would be if attached directly to framework 22. As a result, chains 105 and 106 grip pipe section 40 around substantially its entire circumference (on the order of about 330°), minimizing the possibility of the welding machine being dislodged from the position in which it is secured during the welding operation.

*Ring gears, ring gear frames, and ring gear drive trains*

Turning now to FIGURES 5-7, ring gears 24 and 26 are substantially identical as are ring gear frames 58 and 60. Therefore, only forward ring gear 26 and its gear frame 60 will be described, it being understood that the ensuing description of these components is equally applicable to the rear ring gear 24 and its frame 58.

Ring gear 26 is formed as a segment of a ring or annulus and, as shown in FIGURE 5, has a rectangularly sectioned main body portion 110 and an integral, inwardly directed annular flange 112 which extends into a correspondingly configured annular recess 114 formed in gear frame 60. Ring gear 26 is retained in ring gear frame 60 by a ring-shaped plate 116 fixed to ring gear frame 60 by bolts 118. Retaining plate 116 and ring gear frame 60 support and guide ring gear 26 in a circular path around the periphery of the pipe section on which the welding machine is located. Since ring gear 26 and its frame 60 both encompass arcs of about 270°, the ring gear will, as shown in FIGURE 6, traverse the gap between the lower ends of ring gear 60, permitting the ring gear to be revolved through a full circle, if desired.

Referring now to FIGURES 1, 6, and 7, the motor 34 provided to rotate ring gear 26 is bolted or otherwise fixed to welding machine framework between transversely extending rib 56 and the rear ring gear frame 58. The output shaft (not shown) of motor 34 is operatively connected to a reduction drive 120 bolted or otherwise secured to framework 22 adjacent motor 34. The output of reduction drive 120 is a pinion 122 which meshes with a spur gear 124 fixed to the rear end of a forwardly extending drive shaft 126.

Drive shaft 126 is rotatably supported in spaced apart drive shaft supporting brackets 128 and 130 which are bolted to ring gear frames 58 and 60, respectively. Drive shaft supporting brackets 128 and 130 included integral pillow blocks 132 having bores 134 through which drive shaft 126 extends. Appropriate bearings 136 are disposed in bores 134 around drive shaft 126.

As is best shown in FIGURE 6, a pinion 138 is fixed to drive shaft 126 adjacent pillow block 132 of drive shaft supporting bracket 130. Pinion 138 meshes with a spur gear 140 fixed to a stub shaft 142 journalled in a bearing 144 inserted in a through bore 146 formed in an integral pillow block 148 in bracket 130. Fastened on stub shaft 142 adjacent spur gear 140 are a pair of spur gears (not shown) over which roller chains 150 and 152 extend. A spur gear 154, fixed to shaft 142 adjacent its forward end, meshes with and drives ring gear 126.

Roller chain 150 extends downwardly and, at its lower end, around a spur gear 156 fixed to a stub shaft 158. Shaft 158 is rotatably supported in a support bracket 160 bolted to ring gear frame 60 in substantially the same manner that shaft 142 is supported in bracket 130. A spur gear 162, fixed to shaft 158 adjacent its forward end, meshes with and drives ring gear 26.

Turning now to FIGURE 7, roller chain 152 extends substantially horizontally and, at its right-hand end, over a spur gear 164 fixed to a stub shaft 166 mounted in a bracket 168 bolted to ring gear frame 60 in substantially the same manner that shaft 158 is mounted in bracket 160. A spur gear 169, fixed to the forward end of shaft 166, engages and drives ring gear 26. Fixed to the rear end of stub shaft 166 adjacent spur gear 164 is a spur gear (not shown) over which a roller chain 170 extends. Roller chain 170 extends downwardly and, at its lower end, extends around and engages a spur gear 172 which is fixed to a stub shaft 174 rotatably mounted in a bracket 176 in substantially the same manner that shaft 158 is mounted in bracket 160. Fixed to the forward end of shaft 174 is a spur gear 178 which meshes with and drives ring gear 26.

From the foregoing, it will be apparent that drive motor 34 simultaneously rotates the four spur gears 154, 162, 169, and 178 engaged with ring gear 26. As is shown in FIGURES 6 and 7, these four spur gears are so located that two of them will always be in meshing, driving engagement with ring gear 26. To prevent the shafts supporting spur gears 154, 162, 169, and 178 from being twisted out of alignment when drive motor 34 is operated, the shaft supporting brackets 160, 130, 168, and 176 are connected by tie bars 180, 182, and 184 fixed, at their opposite ends, to adjacent ones of the brackets as by bolts 186. Trapezoidally shaped plates 188 are provided as a base to support a protective shield designed to cover the gears and chains.

Referring next to FIGURE 7, the drive train 36 interposed between drive motor 32 and ring gear 24 is substantially identical to the drive train 38 described above and, therefore, a detailed repetitious description of this drive train is believed to be unnecessary. The corresponding components of drive trains 36 and 38 are identified by identical reference characters except that the reference characters of drive train 36 are primed. The only substantial distinction between the two drive trains arises from the fact that drive motor 32 is mounted transversely in welding machine 20 rather than being oriented longitudinally as is drive motor 34.

*Welding heads and accessories*

Referring first to FIGURES 3, 6, and 7, welding heads 28 and 30 are mounted on T-shaped mounting pads 190 and 192 bolted to the forward sides of ring gears 24 and 26. Each of the welding heads, as shown in FIGURES 1-3, includes a supporting member 194 fixed on the associated supporting pad. A weld head guide 196 is fixed to each supporting member 196. Slidably mounted in each of the weld head guides 196 are a pair of elongated, circular sectioned rods 198 and 200 connected, at their upper ends, by a transversely extending bar 201. Connected to the lower ends of rods 198 and 200 are castings 202 and 204 through which horizontally oriented rods 206 and 208 slidably extend. Parallel rods 206 and 208 support a welding torch mounting bracket 210 to which a conventional arc welding torch 212, such as the Linde HW-16 machine welding torch, is attached in any appropriate manner. Each welding torch 212 is enclosed in a protective shield or shroud 214 of conventional construction to protect the torch, arc, and puddle of molten weld metal from dust, rain, and other deleterious conditions encountered in on-site welding. Windows 215 in the lower ends of shrouds 214 permit the welding machine operator to observe the arc and the weld.

The lower ends of welding torches 212 are maintained a predetermined distance from the surface of the workpiece (here pipe section 40) by a guide roller 216 fixed to an axle 218 which is rotatably journalled in a U-shaped bracket 220. Axle supporting brackets 220 are connected to welding head shrouds 214 by support assemblies indicated generally by reference character 222. Adjustment knobs 224 permit guide rollers 216 to be raised and lowered relative to welding torches 212 to vary the spacing between the welding torches and the workpiece. Movement of the welding torches relative to the workpiece is accommodated by the sliding arrangement of the welding torch supporting rods 198 and 200 in weld head guide 196.

Each of the welding heads 28 and 30 includes a welding torch oscillator 226 mounted on pads 190 and 192, respectively. Oscillators 226 may be of any conventional, commercially available type such as the Lincoln Spreadarc Attachment L3004 or L3005. As the welding torches move around the periphery of pipe section 40 during the welding operation, oscillator assemblies 226, which are connected to welding torches 212 by linkages indicated generally by reference character 228, oscillate welding torches 212 in a well known manner, enhancing the quality of the weld. Each of the oscillators 226 includes a dwell control 230 by which the oscillation of welding torches 212 may be selectively varied. Since oscillators of this type and their functions are well known and since such oscillators, by themselves, form no part of the present invention, a more elaborate description of these devices is not deemed necessary herein.

Each of the welding heads 28 and 30 is also provided with a weld wire reel 432 and a motorized wire feed 234, both of conventional standard construction. As is best shown in FIGURE 1, each of the wire reels 232 is rotatably journalled on an axle 236 which, in turn, is supported by brackets 238 (only one of which is shown) which are fixed in any appropriate manner to spaced apart mounting plates 240. The mounting plates 240 are attached as by bolts (not shown) to the ring gear supported mounting plates 190 and 192. Mounting plates 240 provide a space through which the lower portion of wire reel 232 extends as is shown in FIGURE 3.

Wire feed assemblies 234 may be of any conventional construction such as, for example, Linde wire feed units model number SWM–2 which utilize 40V25 motor units identified generally by reference character 242. Wire feed assemblies 234 operate in the conventional manner, feeding welding wires 244 from welding wire reels 232 through hollow, flexible conduits 246 to welding torches 212. Since welding wire reels 232 and welding wire feed assemblies 234 are of conventional construction and since they, by themselves, form no part of the present invention, a more elaborate description of these components is not deemed necessary.

Welding torch 212 of welding head 30, the oscillating assembly 226 associated with welding head 30 and the motor 242 of the wire feed assembly 234 associated with welding head 30 are connected to control box 48 by cables 248 and 250 which are bound together by clips 254 into a cable assembly 256. At its forward end, cable assembly 256 passes through guides 258 and 260 and around spool type insulators 262 and 264 which are fastened to shroud 74 in an appropriate manner. The torch 212, oscillator 226, and wire feed assembly motor 242 of welding head 28 are similarly cabled to control box 50.

Inert shielding gas is supplied to both welding heads from a single source such as a pressurized cylinder (not shown). From the source the gas flows through flexible line 265 incorporated in the cable assembly leading to welding head 30 and, through a similar line, to welding head 28. The welding torches 212 in these heads have hollow barrels through which the gas flows from the flexible supply lines to the area of weld formation. The above-described gas-supply system is merely an exemplary conventional, commercially available system and is not critical to the practice of the present invention.

*Welding machine control and programming system*

The movement and operation of welding head 28 and its accessories are controlled by control box 48 and programmer 46, and the movement and operation of welding head 30 and its accessories by control box 50 and an identical programmer 46 (not shown). It will be apparent, therefore, that an independent control and programming system is provided for each of the welding heads and that the movement and operation of each of these heads may be independently controlled. Control boxes 48 and 50 may be of any desired conventional construction such, for example, the Lincolnweld control panel produced by the Lincoln Electric Co. or the Linde Model SCC–6 control box. Control boxes 48 and 50 are attached to welding machine framework 22 by suitable brackets (not shown), preferably between transversely extending ribs 52 and 54 of the welding machine framework. Each of the control boxes 48 and 50 includes a voltage control 266, a volt meter 268, a welding current control 270, an ammeter 272, and a number of other standard welding machine controls which will be discussed in conjunction with the operation of welding machine 20.

Programmers 46 (only one of which is shown) are disposed on opposite sides of welding machine 20 and are bolted to or otherwise mounted on the longitudinally extending connecting members 77 extending between transverse rib 56 of framework 22 and rear ring gear frame 58. Turning now to FIGURE 14, each of the programming devices 46 includes a housing 274, a rotatable programming disc assembly 276, and a parallel row of micro switches 278a–j having actuators 280 immediately below the programming disc assembly. Programmer 46 also includes a programming drive train indicated generally by reference character 282.

Programmer housing 274 has a cylindrical side wall member 284 to which a circular bottom wall member 286 is fixed as by screws 288. A generally circular top wall member 290 provided with an annular groove 292 is detachably secured to side wall member 284 by screws 294 and wing nuts 296. The heads of screws 294 are welded to angle brackets 298 attached as by welding to side wall member 284 and extending upwardly through apertures 300 in cover member 290.

Programming disc assembly 276 includes a programming disc 302, T-sectioned programming detents 304 (see FIGURE 16), located in annular, concentric slots 305 in the programming disc (see FIGURE 15), and Allen head screws 306 for fixing detents 304 to the programming disc.

Programming disc 302 has a relatively thin main body portion 308, an integral peripheral stiffener rib 310, and a central hub 312. Programming disc 302 is journalled on a shaft 314 which extends upwardly through an aperture 316 in programming disc hub 312. A washer 318 and nut 320 threaded on the upper end of shaft 314 retain programming disc 302 in place against an annular shoulder 322 provided by an enlarged diameter portion 324 of shaft 314. Programming disc 302 is rotatably fixed to shaft 314 by a pin 326 which extends through aligned apertures 328 and 330 in the enlarged diameter portion 324 of shaft 314 and in the hub 312 of programming disc 302, respectively.

Shaft 314 is rotatably mounted in housing 274 by ball bearings 330 and 332. A reduced diameter shaft portion 333 provides an annular shoulder 334 which rests on the inner race 336 of upper ball bearing 330. The outer race 338 of ball bearing 330 is fixed between a circular, horizontally disposed mounting plate 340 and a retaining ring 342 fitted into a generally cylindrical bearing mounting sleeve 344.

Mounting plate 340 is supported in spaced relationship to a horizontally extending, generally circular bearing plate 346 by cylindrical spacers 348 (only one of which is shown); bolts 350 which extend upwardly through bearing plate 346, spacers 348, and mounting plate 340; and nuts 352 threaded on the upper ends of bolts 350. Sleeve 344 is fastened to bearing plate 346 by cap screws 354 which extend downwardly through an integral annular flange 356 of sleeve 344 into threaded engagement with drilled and tapped apertures 358 in bearing plate 346. In addition, the lower portion of sleeve 344 extends downwardly into a centrally located bore 359 in mounting plate 346, positively locating the bearing mounting relative to the bearing plate. Bearing plate 346 is supported in fixed relation to housing bottom wall 286 by spacers 360, studs 361 fixed to mounting plate 346 by nuts 362, and screws 363 which fix the studs to housing bottom wall 286.

The lower bearing 332 is fixed in a central aperture 364 in lower housing wall 286 by a retaining ring 365 inserted in the lower housing wall and a retaining ring 366 fitted into a reduced diameter portion 368 of shaft 314.

The drive train 282 by which programming disc 302 is rotated includes a gear 370 fixed by a setscrew 372 to a shaft 374 which is rotatably mounted in programmer housing 274 by ball bearings 376 and 378. Ball bearing 376 is retained in an aperture 380 in housing bottom wall 286 by retaining rings 382 and 384 fitted into shaft 374 and housing bottom wall 286 on opposite sides of the bearing. Roller bearing 378 is similarly retained in an aperture 386 in bearing plate 346 by retaining rings 388 and 390 fitted into shaft 374 and bearing plate 346 on opposite sides of bearing 378.

A pinion 392 is rotatably fixed to shaft 374 by a nut 394 which presses pinion 392 against an annular shoulder 396 on shaft 374. Pinion 392 meshes with a spur gear 398 rotatably fixed to a shaft 400 supported by ball bearings 402 and 404. Bearing 402 is disposed in an aperture 406 in housing bottom wall 286 and is retained in place by retaining rings 408 and 410 fitted into shaft 400 and housing bottom wall 286. Bearing 404 is disposed in an aperture 412 in bearing plate 346 and is retained in place by retaining rings 414 and 416 fitted into shaft 400 and bearing plate 346.

Rotatably fixed on shaft 400, and separated from spur gear 398 by a washer 418, is a pinion 420. A nut 422, separated from pinion 420 by washer 424, presses pinion 420 and spur gear 398 against an annular shoulder 426 of shaft 400. Relative rotation of pinion 420 and spur gear 398 is precluded by a pin 428 which extends through the pinion, washer 418, and spur gear 398.

Pinion 420 meshes with a spur gear 430 rotatably fixed to a shaft 432 supported by ball bearings 434 and 436. Ball bearing 434 is disposed in an aperture 438 in housing bottom wall 286 and is retained in place by retaining rings 440 and 442 fitted into shaft 432 and housing bottom wall 286. Bearing 436 is retained in an aperture 444 in bearing plate 346 by retaining rings 446 and 448 fitted into shaft 432 adjacent its upper end and into bearing plate 346. Rotatably fixed to shaft 432 and separated from spur gear 430 by a washer 450 is a pinion 452. A nut 454, separated from pinion 452 by a washer 456, presses pinion 452 and spur gear 430 against an annular shoulder 458 of shaft 432. Pinion 452 meshes with a spur gear 460 journalled on the main shaft 314 to which program disc 302 is rotatably fixed. Movement of gear 460 relative to shaft 314 is precluded by a setscrew 462 which extends through a drilled and tapped aperture 463 in the gear hub 464 into engagement with a flat 466 on shaft 314.

Referring now to FIGURE 15, as program disc 302 is rotated by input gear 370 through the drive train 282 described above, detents 304 engage and depress the actuators of micro switches 278a–j for periods dependent upon the lengths of the detents and the speed at which programming disc 302 rotates. By arranging detents 304 in different ones of the program disc slots 305, by varying the lengths of the detents, and by varying their positions within a given slot, different ones of the switches 278a–j may be closed in a predetermined sequence, at predetermined intervals, and for preselected periods of time.

Micro switches 278a–j are mounted on mounting plate 340 between a pair of angle brackets 470 and 472 fixed to the mounting plate in any desired manner. Insulating blocks 474 are disposed between adjacent switches to prevent arcing. This collocation of switches and insulating blocks is maintained in its assembled condition by an elongated bolt 476 which extends through and between angle brackets 470 and 472 and a nut 477 threaded on the end of the bolt. A stiffening element 478 is secured in place by a cap screw 480 extending upwardly through mounting plate 340 into threaded engagement with the stiffener. The element 478 provides additional support to the long grouping of micro switches.

The input gears 370 of the two programmers 46 are driven by the drive motors 32 and 34 employed to rotate ring gears 24 and 26. As is shown in FIGURE 7, a bevel gear 482 is fixed to the output shaft (not shown) of the gear reduction drive 120' associated with drive motor 32 adjacent output pinion 122'. Bevel gear 482 meshes with a bevel gear 484 which is the input of a reduction drive 486 mounted on a plate 488 fixed to welding machine framework transverse rib 56 by brackets 490 and 492. The output shaft 494 of gear reduction drive 486 is operatively connected to and drives input pinion 370 of the programmer 46 associated with drive motor 32 and ring gear 24. The nature of the gear train interposed between the drive motors and the programmers will, of course, vary from installation to installation and will depend upon the relative mounting of the drive motors and programmers. The details of such drive trains are not critical in the practice of, and by themselves form no part of, the present invention.

Figure 17:
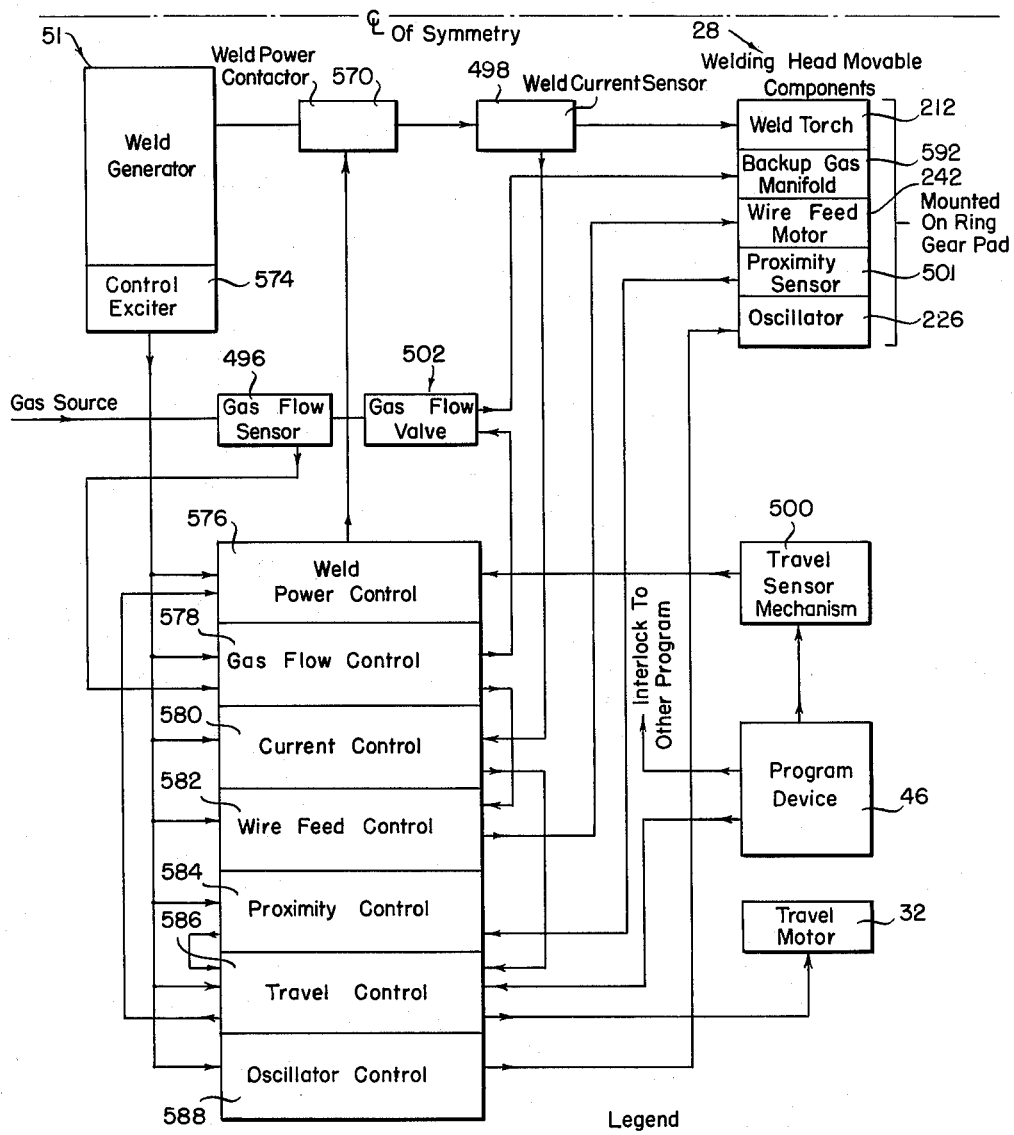
FIGURE 17 is a schematic illustration of one of the two substantially identical control systems employed to control the welding heads.

Turning now to FIGURE 17, the welding machine control system includes, in addition to control panels 48 and 50 and programmers 46, gas flow sensors 496, weld current sensors 498, travel sensors 500, and a proximity sensor 501. A gas flow sensor 496 (shown diagrammatically in FIGURE 8) is provided for each head to ensure that the welding operation of the associated cycle is terminated if there is an interruption of the flow of the protective gas to the welding torch 212 since a continuous protective gas shield over the weld puddle is essential to the production of an acceptable weld. Each gas flow sensor 496 is operatively connected to a gas flow valve 502 interposed in the gas supply line 265 to the associated welding head. Gas flow valve 502 is biased closed, but may be opened by the energization of a solenoid 504 connected to an electrical lead 506. During the welding cycle, as will be explained in more detail later, control circuit current flows in lead 506, solenoid 504 is energized, and valve 502 is opened, allowing the protective gas to flow through gas supply line 265.

Gas flow sensor 496 includes three bellows elements 508, 510, and 512, each having a switch actuator 514 connected to its free or movable end. Actuators 514 are connected, respectively, to the normally open contactors 516, 518 and 520 of switches serially interposed in lead 506. Bellows 508 is connected to a static tube 521 in gas supply line 265 and measures the static pressure of the gas flowing through the supply line. If the pressure of the flowing gas falls below that needed to maintain a continuous protective gas shield over the weld puddle, generally on the order of 50 p.s.i.g., such as when the gas cylinder (not shown) runs empty, bellows 508 collapses, closing switch 516 and completing a circuit to a gas flow control in the control panel which interrupts the welding cycle of the associated welding head.

In addition to a predetermined minimum static pressure, the gas must flow at a predetermined minimum rate to ensure an effective protective blanket over the weld puddle. Bellows element 510 is connected to a Pitot tube 522 in gas supply line 265 and, therefore, measures the velocity pressure of the gas flowing through the supply line. Should the velocity pressure drop below a predetermined minimum, generally on the order of about 2 p.s.i.g., bellows element 510 will collapse, closing switch contactor 518 and completing a circuit to the gas flow control which, as explained above, will terminate the welding cycle.

The third bellows element, 512, is provided to sense pressure build-ups caused by kinks or obstructions in supply line 265 which would result in decreased flow of the protective gas through the supply line. The interior of bellows element 512 communicates with a static tube 524 which extends into supply line 265. If the pressure in supply line 265 increases to a value above that for which bellows element 512 is set, the bellows element will expand, forcing switch contactor 520 against its associated contact 526, completing a circuit to the gas flow control which, as explained above, will then terminate the welding cycle.

Each of the two weld current sensors 498 is employed to ensure that the welding cycle of the associated welding head will be terminated if the welding torch 212 loses its arc. Weld current sensor 498, as shown diagrammatically in FIGURE 9, includes a framework 528 which may be fixed to welding machine framework 22 at any desired location. An elongated bar 530 of spring temper is pivotally connected to an upstanding leg 532 of framework 528 as by a pivot stud 534. At its free end, spring bar 530 carries a contact 536 which is adapted to engage a contact 538. Extending through framework 528 in spaced relation to spring arm 530 is a bus bar 540 which is connected in the circuit between weld generator 51 and the associated welding torch 212 so that, when welding current is flowing, bus bar 540 will generate a magnetic field, drawing spring arm 530 downwardly and closing contact 536 against contact 538. This completes a circuit through the current control in the associated control panel which, as long as this circuit remains completed, allows the welding cycle to proceed. If the arc is lost, current will cease to flow through bus bar 540 and spring arm 530 will move upwardly, moving contact 536 away from contact 538 and interrupting the circuit to the current control which will then operate to interrupt the welding cycle.

If movement of a welding head is interrupted during the welding cycle as by failure of a drive motor, for example, the welding torch will cease to move and will create a distorted and exaggerated weld blob in the area in which it has been welding. Such blobs require considerable rework and, perhaps, rejection of a weld. To prevent the occurrence of such blobs, a travel sensor 500, shown diagrammatically in FIGURES 10–13, is employed with each of the drive motors 32 and 34 provided for moving welding heads 28 and 30 through the welding cycle. Travel sensor 500, which is diagrammatically illustrated in FIGURES 10–13, includes a supporting bracket 542 which may be fixed in any appropriate manner to welding machine framework 22. Bracket 542 rotatably mounts a shaft 544 to which a friction brake disc 546 and a backing ring 548 are rotatably fixed. The rotational movement of friction brake disc 546 is limited by a detent 550 which depends into a slot 552 cut in the periphery of the brake disc. In the absence of an external force on friction brake disc 546, detent 550 is centered in peripheral slot 552 by springs 554 and 556 connected between detent 550 and brake disc 546 on opposite sides of slot 552.

Figure 10:
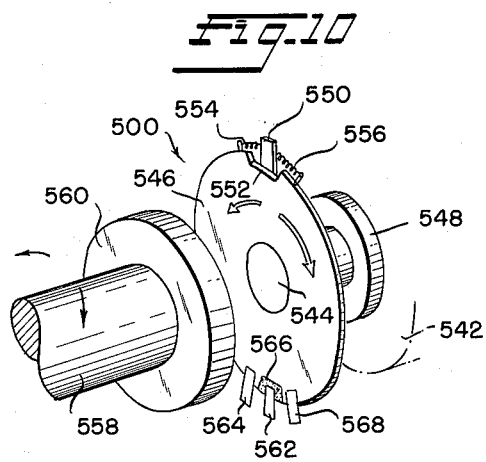
FIGURE 10 is a generally diagrammatic view of a travel sensor employed to shut down the apparatus if movement of a welding head is interrupted.

As is best shown in FIGURE 10, brake disc 546 is mounted immediately adjacent the free end of the output shaft 558 of the drive motor 32 or 34 with which the travel sensor is associated so that the friction brake disc will be frictionally engaged by an end plate 560 fixed to the end of the motor output shaft. When the associated drive motor is energized, its output shaft 558 and end plate 560 rotate and the frictional drag of the end plate on the friction brake disc 546 rotates the latter against the bias of spring 554, for example, in a clockwise direction from the position shown in FIGURE 12 to the position shown in FIGURE 13. In the latter position, a pair of stationary contacts 562 and 564 arranged adjacent the lower edge of and in contact with the face of brake disc 546 are electrically connected by a conductive segment 566 incorporated in the brake disc. Contacts 562 and 564 are incorporated in a circuit which, when the circuit between these contacts is completed, allows the welding cycle of the associated welding head to proceed. If the drive motor stops, the force of the stretched biasing spring 556 will overcome the friction between brake disc 546 and end plate 560, restoring the brake disc to the position shown in FIGURE 12. In this position contact segment 566 no longer bridges the gap between contacts 562 and 564 and the circuit to the associated travel control is interrupted, effecting a termination of the welding operation of the associated head.

During a particular welding cycle, the direction of rotation of the drive motor may be reversed, so that its output shaft 558 rotates in a counterclockwise direction. In this event, travel sensor 500 will operate in the manner described above except that it will be moved by end plate 560 from the position shown in FIGURE 12 to the position shown in FIGURE 11. As is shown in the latter figure, the contact segment 566 of friction brake disc 546 bridges and completes a circuit through stationary contact 562 and a stationary contact 568 disposed on the opposite side of contact 562 from stationary contact 564, completing a conditioning circuit to the associated travel control as described above. If the arc is lost while friction brake disc 546 is in the FIGURE 11 position, the potential energy stored in biasing spring 554 will overcome the friction between end plate 560 and brake disc 546 and restore friction brake disc 546 to the FIGURE 12 position, interrupting the control circuit and terminating operation of the associated welding head.

Turning now to FIGURE 2, proximity sensor 501 is a spring loaded switch mounted on the shield 214 of welding head 28 with its actuator 572 disposed in the path of movement of welding head 30. The contacts (not shown) of switch 501 are biased open, but may be closed by the depression of actuator 572. If, due to a malfunction in the control system, or for some other reason, welding heads 28 and 30 move into close proximity, actuator 572 will be depressed, closing the switch contacts and completing a circuit to the proximity control in one of the control boxes 48 or 50 to terminate the welding operation.

*Welding head control operation*

Since the controls associated with the two welding heads 28 and 30 are alike, only the function of the controls associated with head 28 will be described in detail.

Referring now to FIGURES 17 and 18, closing of the welding machine start switch (not shown) completes a circuit from weld generator 51 through control exciter 574 to and energizes the weld power control 576, gas flow control 578, current control 580, wire feed control 582, proximity control 584, travel control 586, and oscillator control 588 in control box 48.

Energization of weld power control 576 causes it to complete a circuit to and condition weld power contactor 590.

Upon activation, gas flow control 578 completes a circuit to the solenoid 504 (see FIGURE 8) of gas flow valve 502, allowing the shielding gas to flow from the gas source through supply line 265 and back-up gas manifold 592 to welding torch 212 and, in addition, further conditions wire feed control 582.

Upon being activated by control exciter 574 and conditioned by gas flow control 578, wire feed control 582 energizes wire feed motor 242 of the wire feed 234, causing it to feed the welding wire 244 from reel 232 through flexible tube 246 to welding torch 212 to provide the weld metal for laying a bead in the gap 44 between pipe sections 40 and 42.

Energization of current control 580 causes this control to establish a circuit to and further condition travel control 586. Travel control 586 is further conditioned by proximity control 584 which, when energized, establishes a conditioning circuit to the travel control. Upon being conditioned by the circuits from control exciter 574, current control 580, and proximity control 584, travel control 586 establishes a circuit to drive motor 32 which, operating through drive train 36 (see FIGURE 1), rotates ring gear 24, moving weld head 28 through a programmed sequence of movements.

Simultaneously, travel control 586 establishes a second circuit to and further conditions weld power control 576. As drive motor 32 begins to rotate, the end plate 560 (see FIGURE 10) attached to its output shaft 558 rotates friction brake disc 546 clockwise (or counterclockwise depending upon the movement for which weld head 28 is programmed) establishing electrical contact between fixed contact 562 and one of the two fixed contacts 564 or 568, establishing a final condition circuit from travel sensor 500 to weld power control 576. Upon receiving this final conditioning signal, weld power control 576 establishes an activating circuit to weld power contactor 590 which then allows welding current to flow from weld generator 51 through the power contactor and the bus bar 540 of weld current sensor 498 to weld torch 212, producing a welding arc between the torch and the workpiece. The flow of current through bus bar 540 draws the armature 530 of the weld current sensor 498 in a counterclockwise direction, closing its contacts 538 and 536 and completing a holding circuit through current control 580 which, if broken by failure of the welding current, will allow current control 580 to de-energize, terminating the welding cycle.

Upon being activated, oscillator control 588 establishes a circuit to the oscillator 226 mounted on the weld supporting pad 190 fixed to ring gear 24, activating the oscillator which operates thereafter in a well known manner to oscillate the welding torch relative to the molten puddle of weld metal to eliminate defects which might otherwise form in the weld.

Referring now to FIGURES 8 and 17, if the shielding gas supply source runs empty during a welding cycle, the bellows element 508 of gas flow sensor 496 will collapse, closing switch contact 516 and 518, establishing a circuit to gas flow control 578 which, upon completion of this circuit, establishes a cycle terminating circuit to wire feed control 582. Being thus energized, wire feed control 582 interrupts the circuit to and stops wire feed motor 242. As a result, the arc between welding torch 212 and the the workpiece is broken, terminating the flow of welding current from weld generator 51 which permits the contacts 536 and 538 to weld current sensor 498 to open. The holding circuit through current control 580 is therefore interrupted, breaking the conditioning circuit to travel control 586 which, as a result, stops drive motor 32 and terminates the welding operation of head 28.

Similarly, if the flow of shielding gas through supply line 265 falls below the predetermined flow rate, bellows element 510 of gas flow sensor 496 will collapse, completing a welding operation terminating circuit to gas flow control 578. The same result obtains if, due to an obstruction or kink in supply line 265, the pressure in supply line 503 abnormally rises since, in this event, bellows element 512 will expand, closing contacts 520 and 526 to establish the welding operation terminating circuit to gas flow control 578.

Figures 11, 12, 13:
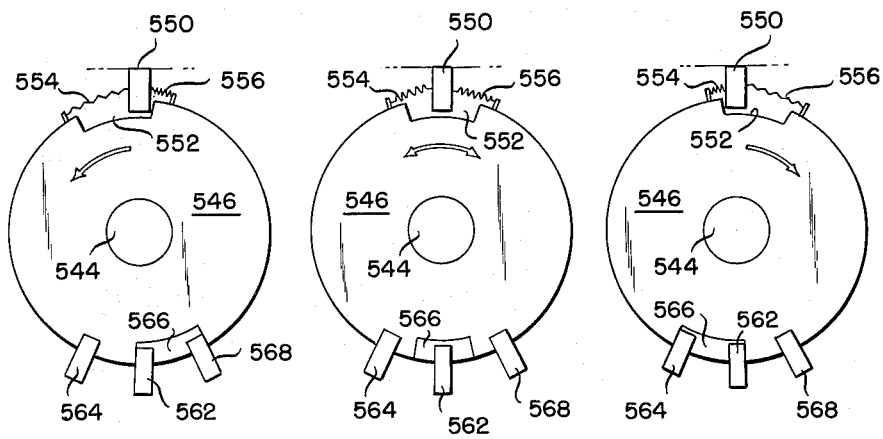
FIGURES 11–13 are side elevations of a friction brake disc incorporated in the travel sensor and illustrate the modus operandi of the travel sensor.

If the movement of welding head 28 is terminated during the welding operation, by malfunction of drive motor 32, for example, the output shaft 558 of drive motor 32 and end plate 560 will cease to rotate, permitting biasing springs 554 or 556 (see FIGURES 10–13) to rotate friction brake disc 546 of travel sensor 500 from the position of FIGURE 11 or 13 as the case may be to the deactivated position of FIGURE 12. This interrupts the conditioning circuit to weld power control 576 which in turn deactivates weld power contactor 590, interrupting the flow of welding current which, in the manner described above, terminates the welding operation.

*Programmer operation*

As was pointed out above, the program disc 302 of the programmer 46 associated with welding head 28 is rotated by the output shaft 558 of drive motor 32 and, therefore, rotates in timed relation with ring gear 24. Programmer 46 controls the speed and direction of rotation of drive motor 32 through various ones of the micro switches 278a–j whch are closed at different points and for varying lengths of time in the welding cycle by detents 304. One typical welding program is shown in FIGURES 18 and 19. When the welding machine start button (not shown) is pushed, the various controls in control box 48 are energized in the manner described above, supplying welding current, shielding gas, and welding wire to the torch 212 of welding head 28. As the welding wire approaches the workpiece, an arc is struck, energizing travel motor 32. Travel motor 32 rotates ring gear 24 and welding head 30 downwardly in a counterclockwise direction around the periphery of pipe sections 40 and 42 at a welding speed on the order of 20 inches per minute for a root pass or 8 inches per minute for a cover pass and, through the drive train described above, rotates program disc 302 of programmer 46. As program disc 302 rotates, a micro switch 278 is closed by a detent 304, establishing a circuit through the programmer associated with welding head 28 to travel motor 34 which rotates ring gear 26 in a counterclockwise direction, causing welding head 28 to follow welding head 30 until head 28 reaches the twelve o'clock position. As welding head 28 reaches the twelve o'clock position, one of the micro switches 278 in the programmer 46 associated with welding head 28 is closed by a detent 304, initiating the control sequence described above to effect supply of welding current, welding wire, and shielding gas to the welding torch 212 in welding head 28. As the wire approaches the workpiece, an arc is struck and travel motor 34 is energized and rotates ring gear 26 in a clockwise direction. This moves welding head 28 downwardly around the peripheries of pipe sections 40 and 42 in a clockwise direction toward the six o'clock position, laying a bead in the gap 44 between pipe sections 40 and 42.

As the welding heads weld downwardly, welding head 30 reaches the six o'clock position. At this point, its programmer 46: (1) stops the flow of gas to its welding torch 212 which in the manner described above terminates the welding operation; and (2) causes the welding head to reverse in direction and move upwardly without welding to its home twelve o'clock position at a return speed on the order of 160 inches per minute. Thereafter, welding head 28 will arrive at the six o'clock position and its programmer 46 will then terminate its welding operation and return it, without welding, to its one o'clock home position. As each head reaches its home position, the programmer 46 associated with it de-energizes the associated travel motor.

As the molten weld metal is deposited in gap 44 in the six o'clock area, a gravitational pull is exerted on the weld puddle. To prevent gravitational pull from having an adverse effect on the quality of the weld, the welding cycle diagrammatically illustrated in FIGURES 20 and 21 may be employed. The programmer 46 associated with welding head 30 is programmed to initiate the welding cycle and move welding head 30 from a twelve o'clock home position to the ten or eleven o'clock position at a relatively rapid welding speed (on the order of 40 inches per minute for a root pass or 16 inches per minute for a cover pass) to deposit a relatively thin bead in the gap 44 between pipe sections 40 and 42. At the ten or eleven o'clock position, the welding speed of welding head 30 is decreased to about 20 inches per minute for a root pass or 8 inches per minute for a cover pass, laying a thicker bead in gap 44. At the seven or eight o'clock position, the welding speed of welding head 30 is again increased so that a thinner bead will be laid in gap 44. When welding head 30 reaches the four or five o'clock position, the arc is extinguished and the movement of welding head 30 reversed. Welding head 30 is then returned at the rapid non-welding return speed to its twelve o'clock home position.

The programmer 46 associated with welding head 28 is programmed to cause welding head 28 to follow welding head 30 without welding to the ten or eleven o'clock position (i.e., the position where the welding speed of welding head 30 was decreased) and then reverse. Current and gas flow and wire feed to the torch 212 of welding head 28 are then established and welding head 28 is moved at the more rapid welding speed in a clockwise direction to the twelve o'clock position, laying a relatively thin bead over the bead previously laid in gap 44 by welding head 30. At the twelve o'clock position, the welding speed of welding head 28 is decreased and the head moved in a clockwise direction to the four or five o'clock position (i.e., the position at which the bead deposited by welding head 30 ends). At this point, the welding speed of welding head 28 is again increased to the higher speed so that welding head 28 will lay a thin bead on the bead laid in the lower portion of gap 44 by welding head 30. At the seven or eight o'clock position (i.e., the position at which welding head 30 began to lay a thin bead), the arc of welding head 28 is extinguished, the direction of movement reversed, and welding head 28 returned at high speed to its two o'clock home position. Thus, in the region between four-five and seven-eight o'clock two thin, overlapping beads are laid, minimizing the effect of gravitation and freeing the weld from pin holes and other defects.

A wide variety of alternate welding cycles may be programmed by varying the location of detents 304 and their lengths and by altering the connections to the micro switches 278a–j of the programmers 46.

*Proximity control operation*

Should the two welding heads 28 and 30 move into dangerous proximity during the welding cycle, the actuator 572 of proximity sensor 501 (see FIGURE 2) will be depressed, closing switch 501 and completing a circuit from the proximity sensor to proximity control 584. Upon receipt of this signal, the proximity control establishes a circuit to travel control 586 which causes the travel control to stop travel motor 32 and shut off the current to the welding head in the manner described above, terminating the welding operation.

As shown in FIGURE 17, the proximity control 584 of welding head 28 and the proximity control of welding head 30 are interlocked through the programmers 46 by connecting switches 278 in the two programmers and arranging detents 304 in the two programmers to close the connected switches during the welding cycle. At the same time that welding head 28 proximity sensor 584 stops welding head 28, it transmits a signal through the interlock to the proximity control of welding head 30 which, upon receipt of the signal, stops welding head 30, extinguishes its arc, and shuts off the flow of protective gas and welding wire to it.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In the method of joining two axially aligned pipe sections having a narrow gap therebetween with welding apparatus having two inert gas-shielded, consumable electrode welding heads adapted to move around said pipe sections in a plane substantially normal to the longitudinal axes of said sections and in axial alignment with said gap, the improvement wherein said heads are moved downwardly in opposite directions around said pipe sections to lay a complete girth weld with a single pass of said heads.

2. The method as defined in claim 1, wherein:
   (a) the welding speed of said heads is increased as said heads approach the lower reaches of said pipe sections to provide a thinner bead and thereby minimize the gravitational pull on the molten weld metal; and
   (b) the welds laid by the respective heads in said lower reaches are overlapped to provide a substantially uniform weld around the girth of said sections.

3. The method as defined in claim 1, wherein at the end of its pass, each of said welding heads is moved upwardly around said sections to its original position at a speed equal to several times its fastest welding speed.

4. The method as defined in claim 1, wherein:
   (a) said heads are moved downwardly at substantially the same welding speed; and
   (b) the movements of said heads are synchronized to prevent them from colliding.

5. The method as defined in claim 1, wherein the downward movement of a head is stopped if said head loses its arc or its gas envelope.

6. The method as defined in claim 1, wherein:
   (a) one of said heads is moved downwardly from about the twelve o'clock position to six o'clock at welding speed to lay a bead in one-half of said gap and then returned to twelve o'clock at a substantially faster speed; and
   (b) the other of said heads is concurrently moved at welding speed but without welding from about one o'clock to twelve o'clock, reversed and moved downwardly to the six o'clock at welding speed to lay a bead in the other half of said gap, and thereafter return rapidly to one o'clock.

7. The method as defined in claim 1, wherein:
   (a) one of said heads is moved downward at a relatively rapid welding speed from a twelve o'clock home position to above eleven o'clock to lay a thin bead, then to about eight o'clock at a slower welding speed to lay a thicker bead, then to about four o'clock at the rapid welding speed to lay a thin bead, and then returned to the home position at a speed substantially greater than the more rapid of said welding speeds; and
   (b) the other of said heads is moved without welding from a home position at about two o'clock to about eleven o'clock, reversed and moved at the rapid welding speed from eleven o'clock to twelve o'clock to lay a thin bead on the bead laid by said one head between eleven and twelve o'clock, at the slower welding speed to the four o'clock position to lay a thicker bead, and at the rapid welding speed from four o'clock to eight o'clock to lay a thin bead on the bead laid by said one head from four to eight o'clock, and returned at said rapid speed to its home position.

8. The method as defined in claim 1, wherein current to a welding head is shut off if its movement is interrupted.

9. Arc welding apparatus for joining axially aligned, spaced apart pipe sections, comprising:
   (a) a supporting framework adapted to be rested on one of the pipe sections to be joined;
   (b) a pair of welding heads movably supported on said framework; and
   (c) means on said framework for moving said heads in opposite directions around said pipe sections to simultaneously lay welds in said gap on opposite sides of said sections, whereby a complete girth weld may be laid in a single pass of said heads.

10. The apparatus as defined in claim 9, including means for varying the welding speed of said heads, whereby the thickness of the weld may be altered and whereby each of said heads may be returned at a rapid speed to its home position after completing its pass.

11. The apparatus as defined in claim 9, including means for automatically deactivating said head moving means if the movement of said heads brings them within a predetermined proximity to each other.

12. The apparatus as defined in claim 9, including means for automatically terminating the movement of a head if the arc is extinguished.

13. The apparatus as defined in claim 9:
(a) including means for effecting a continuous flow of an inert shielding gas to said heads; and
(b) means for automatically terminating the movement of a head if the flow to said head is interrupted.

14. The apparatus as defined in claim 9, including means for terminating the welding operation of each of said heads if the movement of said head is interrupted.

15. Arc welding apparatus for joining axially aligned, spaced apart pipe sections, comprising:
(a) a supporting framework adapted to be rested on one of the pipe sections to be joined;
(b) a pair of welding heads movably supported on said framework;
(c) means for moving said heads in opposite directions around said pipe sections to simultaneously lay two welds in the gap between said pipe sections; and
(d) means for independently programming the movement of said welding heads.

16. Arc welding apparatus for joining axially aligned, spaced apart pipe sections, comprising:
(a) a plurality of independently movable welding heads; and
(b) means for effecting synchronized movement of said heads around the periphery of said pipe sections to produce a girth weld therebetween.

17. The arc welding apparatus as defined in claim 16, wherein said last-named means includes:
(a) independent programming means for each of said welding heads; and
(b) means interconnecting said programmers for effecting a time-correlated activation of said welding heads.

References Cited by the Examiner

UNITED STATES PATENTS

| | | | |
|---|---|---|---|
| 1,508,710 | 9/24 | Noble | 219—135 |
| 1,801,140 | 4/31 | Chapman | 219—125 |
| 1,827,245 | 10/31 | Lincoln et al. | 219—125 |
| 1,838,899 | 12/31 | Arnold | 219—125 |
| 2,151,378 | 3/39 | Elsey et al. | 219—135 |
| 2,894,111 | 7/59 | McNutt | 219—60.1 |

RICHARD M. WOOD, *Primary Examiner.*